Figure 1:
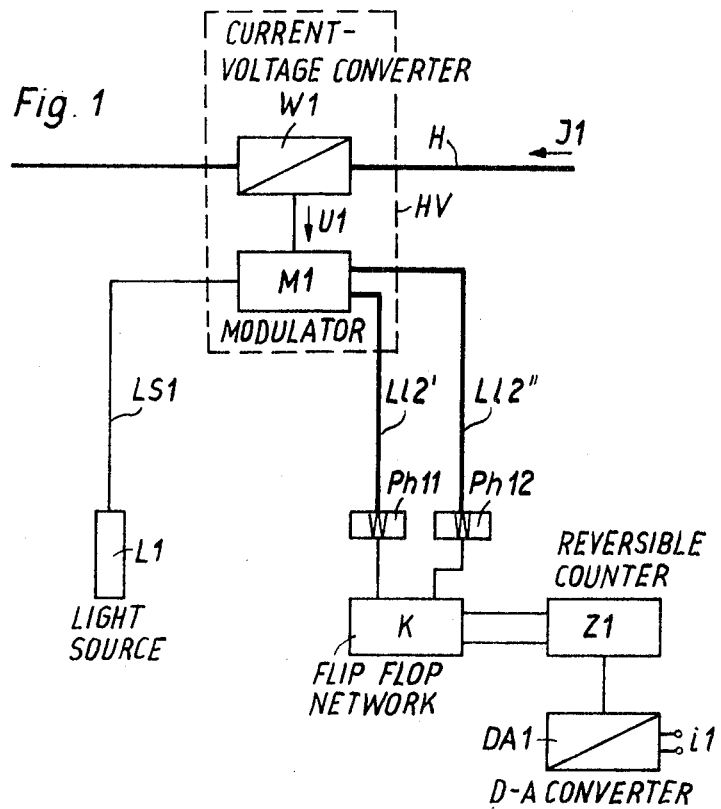

United States Patent
Bensel

[15] 3,662,263
[45] May 9, 1972

[54] APPARATUS FOR MEASURING CURRENT IN HIGH-VOLTAGE LINES

[72] Inventor: Joachim Bensel, Steinau, Germany

[73] Assignee: Siemens Aktiengesellschaft, Berlin, Germany

[22] Filed: Oct. 28, 1970

[21] Appl. No.: 84,636

[30] Foreign Application Priority Data

Oct. 30, 1969 Germany............P 19 55 403.1

[52] U.S. Cl. ...................................324/96, 250/231 R
[51] Int. Cl.......................................................G01r 31/00
[58] Field of Search............356/107, 113; 350/150; 324/96, 324/97; 250/220, 231, 199; 332/12; 340/190

[56] References Cited

UNITED STATES PATENTS 3,485,940  12/1969  Perry.........................................324/96
3,506,833  4/1970  Von Willisen..........................324/96
3,543,151  11/1970  Pelenc....................................324/96

Primary Examiner—James W. Lawrence
Assistant Examiner—D. C. Nelms
Attorney—Curt M. Avery, Arthur E. Wilfond, Herbert L. Lerner and Daniel J. Tick

[57] ABSTRACT

An apparatus for measuring the current flowing through a high-voltage line and transferring the result to a low-potential locality has at the high line-voltage side a magnetic or electric field which varies in dependence upon the current to be measured. An optical modulator controlled by the field variations is interposed in one of two beams of coherent light to modulate this one beam relative to the other. An interferometer or the like device superimposes the modulated and unmodulated beams to produce an interference fringe pattern of alternately bright and dark stripes which travel from one to the other side of the pattern area. Light conductors transmit the resulting optical pulses to photoelectric sensors on low potential. The corresponding electric pulses control a device for counting the interference stripes. At any time the count corresponds to the then obtaining intensity value of the current.

14 Claims, 3 Drawing Figures

APPARATUS FOR MEASURING CURRENT IN HIGH-VOLTAGE LINES

My invention relates to apparatus for measuring current in high-voltage lines and using light for transferring the measured values from the high-voltage to a locality on ground or non-hazardous low electric potential.

In a known measuring apparatus of this general type, a polarized beam of light is modulated under the effect of the current to be measured or under effect of a magnetic field produced by the current. The modulation comes about by rotating the polarization plane of the light through an angle proportional to the current being measured. Located on the low-voltage side of the equipment is a demodulator which receives the polarized light and converts the rotation of the polarization plane into an analogous quantity to serve as a measure of the high-voltage line current. While such an optical transfer of information from the line voltage to the low-potential locality of the demodulator, avoids the high expenditure required for the electrical insulation needed with conventional current transformers galvanically connected to the read-out locality, the system leaves much to be desired because of accuracy and reliability limitations inherent in the optical analogue principle.

There is another system for transferring measured current values from a high-voltage line to a low-voltage locality with the aid of luminescence diode situated on the high-voltage side and acting upon a receiver at the low-voltage side. The receiver comprises a keyer or clock-pulse generator whose pulses act upon a digital counter so that the count corresponds to the instantaneous amplitude of the high-voltage current. In this system, the measuring is primarily done by a counting device on the high-voltage line potential, and the beam of light is used only for transmitting the state of that counter to the remote receiver rather than for ascertaining the measuring value on the high line potential. Hence, much of the essential circuitry is at the high potential of the line and thus not readily accessible to personnel for inspection or in the event of trouble.

It is an object of my invention to device a different and improved way of more accurately and more reliably measuring high-voltage line current than is attainable with an optical transfer of analogue information on current-responsive rotation of a polarization plane; and it is also an object to provide for an optical transfer in a pulse-operated system while affording the electric pulse generating and processing circuitry to be kept remote from the high-voltage line, such as at ground potential or non-hazardous low potential.

Another object of my invention, relating generally to apparatus of the above-mentioned type, is to provide a measuring system which in a particularly advantageous manner affords precisely measuring the phase position of the current passing through the high-voltage line.

A further object of my invention is to secure in current measuring apparatus with an optical transfer of information from the high-voltage line to the low-voltage locality, a wider measuring range than heretofore obtainable in systems of this general type.

To attain these objects and in accordance with my invention, I provide a high-voltage current measuring system generally of the above-mentioned type with optical means that furnish a split beam because of coherent light, and I apply the resulting two beams not only for the desired remote transmission of information to the low-potential locality, but also for effecting the measuring operation at the high potential. More specifically, I phase-modulate one of the two beams of light in dependence upon the current of the high-voltage line and superimpose the modulated beam onto the non-modulated beam in an interferometer or the like device to obtain a pattern of interference fringes which, upon optical transmission from the high to the low electrical potential, are converted by photoelectric means into electric pulse which are processed by a suitable electronic network to furnish the measuring result.

According to other, more specific features of my invention, I interpose an optical modulator arrangement in one of two coherent-light beams and subject the modulator to an electric or magnetic field in which is proportional to, or varies in some other definite dependence upon the high-voltage current to be measured. I further superimpose the modulated beam of light upon the unmodulated beam in an interferometer, or the like to obtain an interference fringe pattern of alternately bright and dark stripes which travel from one side to the other of the interferometer output area; and I provide photoelectric sensor means responsive to the interference stripes and connected to a reversible counter whose counting state at any time corresponds to the high-voltage current magnitude then being measured.

In apparatus according to the invention, the light utilized for ascertaining the measuring value as well as for transmitting the resultant information may be supplied from a source which, in principle, may be arranged on the high-voltage side or on the low-voltage side of the equipment. According to a preferred feature of my invention, however, a considerable simplification as regards the power supply to the light source is obtained by arranging the source on the low potential. Furthermore, since the apparatus according to the invention operates with coherent light, it is preferable to use a laser as the source of light.

As a rule, the two coherent light beams are obtained from a single source by means of a beam splitter, such as a Jamin interferometer, a Mach-Zehnder interferometer or the like.

In apparatus according to the invention, it is further of advantage to provide the modulator with at least one optical system for response to the mutually superimposed beams of light, and to connect two light conductor rods at one end with the optical system, photoelectric cells being disposed at the other ends of the respective rods. The cells supply voltage pulses to a logic network for controlling the counting device to operate in the correct forward or reverse direction.

If it is desired to indicate the measured high-voltage current on the low-voltage potential not as digital value but in analogue form, a digital-analogue converter is preferably connected to the output of the network or to the above-mentioned counting device.

Figure 2:
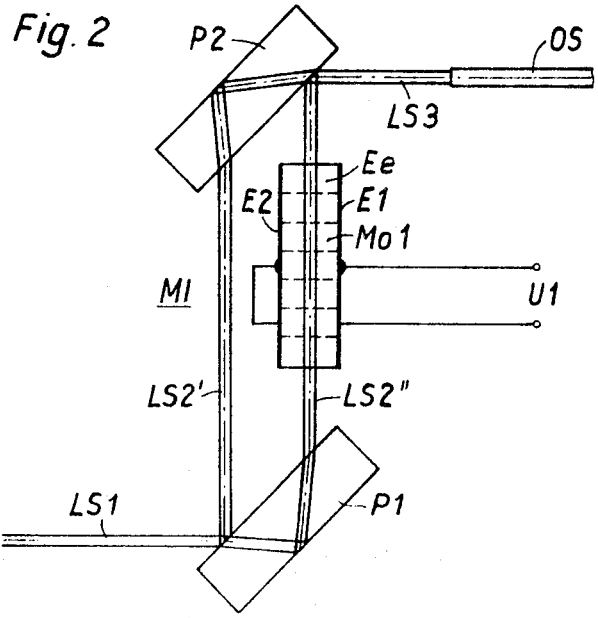
Figure 3:
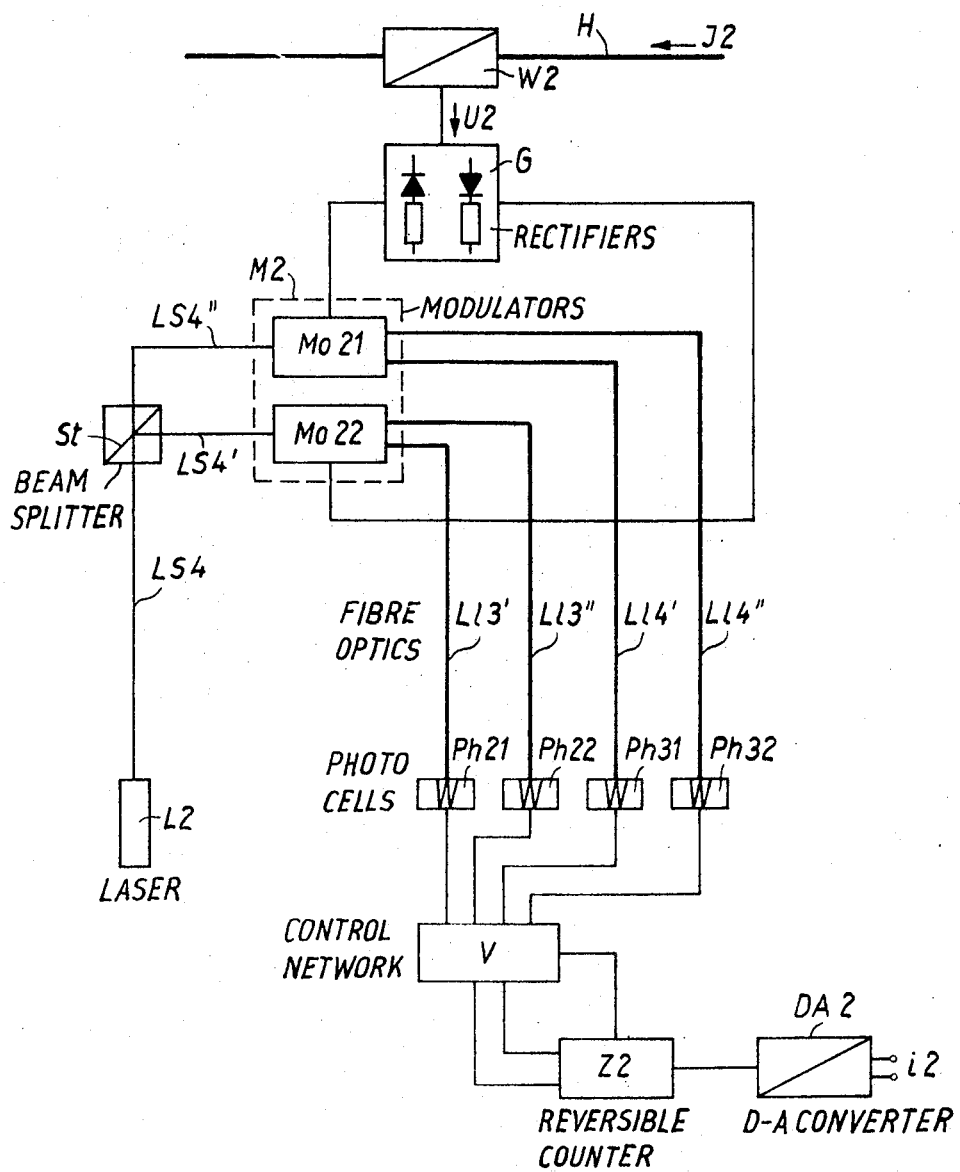

The above-mentioned and further objects, advantages and features of my invention, said features being set forth with particularity in the claims annexed hereto, will be apparent mentioned in the following description of embodiments of my invention illustrated by way of example on the accompanying drawings in which FIG. 1 is a schematic block diagram of a high-voltage line equipped with apparatus for measuring the current and indicating it on low-voltage potential;

FIG. 2 illustrates schematically a coherent-light beam and modulator device which forms part of the apparatus according to FIG. 1; and FIG. 3 is a schematic diagram of a different embodiment of apparatus according to the invention which is equipped with two optical modulators for transferring information on the respective half-waves of an alternating current to be measured.

In FIG. 1 there is shown a high-voltage line H traversed by alternating current J 1. A current-voltage converter W 1 is arranged on the high-voltage line H and issues to a modulator arrangement M 1 a voltage U 1 proportional to the current J 1 to be measured. The current-voltage converter W 1 and the modulator arrangement M 1 are preferably mounted in a common housing HV on the high electrical potential of the line.

The modulator M 1 receives a beam of light LS 1 from a source L 1, preferably a laser (FIGS. 1, 2). The laser beam LS 1 is subjected to two planar parallel plates P 1 and P 2 (FIG. 2) of ground and polished glass which form part of an interferometer and split the source beam LS 1 into two coherent light beams LS 2' and LS 2'' (FIG. 2). The beam LS 2'' passes through the modulator M 1 which, in the embodiment Mo1 of FIG. 2 is of the electro-optical type. The current-responsive voltage U 1 is connected to the electrodes E 1 and E 2 of the modulator Mol shown composed of several individual electro-optical members Ee, E1, E2... (Kerr cells). In modulator Mol the beam LS 2″ is modulated in such a manner that at any moment the change in optical path length of the beam in the modulator corresponds to the instantaneous magnitude of the effective electrical field and consequently is proportional to the current J1 being measured. The beams LS 2′ and LS 2″ are superimposed on a planar parallel glass plate P 2 to furnish a resultant beam LS 3 which is observed in an optical system OS. As a result, a moving pattern of interference fringes becomes recognizable in the optical system OS. Depending upon whether the amplitude of current J 1 is increasing or decreasing, the alternately bright and dark stripes of the fringe pattern move from the left to the right or vice versa in the observation area of the system OS.

Two light conductor rods L 12′ and L 12″ are arranged close to each other and joined with the end of the optical system OS (FIG. 1). The two light rods S 12′ and L 12″ extend to the low-voltage side and terminate at two photoelectric cells Ph 11 and Ph 12. In these cells the interference stripes occurring in the optical system OS and moving past the inlet points of the light rods are converted to electrical pulses which are counted into a counter Z 1 through a control network K which in this case is substantially a flip-flop stage. The counter Z 1 is reversible, the forward and reverse counting direction being determined by the state of the bistable flip-flop stage K responding to the signals coming from the two light conductor convertor L 12′ and L 12″. A digital-analogue convertor DA 1 is shown connected to the output of the counter Z 1 in order to furnish an analogue current value $i$ 1 corresponding to the current J 1 of the high-voltage line H.

In the embodiment of FIG. 3, the high-voltage line H is traversed by alternating current J 2 to be measured. A current-voltage convertor W 2, which may consist of a conventional current transformer, converts the current J 2 to a proportional voltage U2. This voltage is applied through two opposingly poled rectifiers of a rectifier arrangement G to control two respective optical modulators M0 21 and M$i$ 22 of a modulator arrangement M 2 to separately respond to the respective half-waves of the alternating current J 2. For example, if the modulator M0 21 responds only to current values of the negative half-wave, the modulator M0 22 will respond only to measuring values of the positive half-wave. Each of the two component modulators M0 21 and M0 22 may be designed and operate as explained above with reference to FIG. 2.

The two modulators M0 21 and M0 22 receive a beam of light LS 4 from a source L 2, preferably a laser. For thus irradiating the two modulators, the source beam of the laser is split into two beams Ls′ and Ls″ by means of a beam splitter St. While details of the optical system apparent from FIG. 2 are not repeated in FIG. 3, it will be recognized that each of the two optical systems of modulators M0 21 and M0 22 is connected to two light conductor rods L 13′, L 13″ and L 14′, L 14″. On the low-voltage side the light rods are connected to four photoelectric cells Ph 21, Ph 22, Ph 31 and Ph 32. The electrical pulses issuing from the photoelectric sensors Ph 21 to Ph 32 are processed in a logic network V to cause a counting device Z 2 to shift from forward to reverse counting or vice versa, and be reset to zero at each zero-passage of the current J 2 to be measured. As explained, a digital-analogue convertor DA 2 may be connected to the counting device Z 2 so that a secondary current $i$ 2 can be taken off in proportional relation to the primary current J 2.

In principle, the invention is applicable not only for measuring the current in high-voltage lines but is also advantageously suitable with analogue-digital convertor systems to offer the improvement of having the conversion effected only by passive electrical, electro-optical or magneto-optical components.

The above-mentioned intermediate logic network K (FIG. 1) or V (FIG. 3) is needed because in apparatus according to the invention the control of the modulator arrangement by an electric or magnetic field proportional to the current being measured, functions by virtue of the fact that at any moment the optical path length of the light beam passing through the modulator arrangement depends upon the instantaneous magnitude of the effective field. Any change in phase difference between the two light beams by one-half of the path length causes the resultant beam to produce an interference stripe in the optical system (OS, FIG. 2). Since these bright-dark pulses of light are passed through two light conductors to the respective photoelectric sensors, these will issue a corresponding number of electrical pulses to the counting device Z 1 or Z 2. This means that, for example during an increase in current, an increasing number of interference stripes is counted as electrical pulses into the counting device.

However, the bright-dark pulses represented by the interference stripes do not permit recognizing the zero passages of the current nor do they directly indicate ascending or descending values of the current being measured. For that reason, the counting device Z 1, Z 2 must operate in such a manner that, for example with increasing current values, it will count forward action, while with decreasing current values the count will be in the reverse direction. The logic control network interposed between the counting device and the photoelectric sensors serves to set the counter for these different operations.

For understanding this performance it must be kept in mind that, due to the electrically or magnetically controlled change in refraction index, the stripes of the interference fringe pattern move in a given direction, for example during decreasing current values from one toward the other side of the viewing area in the optical system, whereas a reverse change in refraction index, for example with increasing current values, causes the stripes to travel in the opposite direction. The resultant beam in the optical system OS and hence the bright-dark interference stripes impinge sequentially upon the two closely adjacent light conductor rods. Preferably, the diameter of these rods is kept so small, relative to the width of the dark stripes that these stripes cause complete darkening of the optical signal received by each photocell. This makes it possible that with an increasing current the interference stripes will first pass by the first light conductor whose pulse causes the network K or V to prepare the counting device Z 1, Z 2 for a forward run. All interference stripes coming from the same direction are then counted forward and are indicative of the fact that the high-voltage current J 1, J 2 is increasing.

With an alternating line voltages, the interference stripes, after passing through a current maximum, come from the opposite direction so that now the other one of the two light conductor rods will first receive a dark pulse. This causes the intermediate network K, V to block the forward input of the counting device Z 1, Z 2 so that the pulses are counted in the reverse direction.

If an alternating current is measured in apparatus according to the invention, the number of the measuring values taken per cycle period depends upon the magnitude of the maximal current, a measuring value being available after each change of current by the amount Δ $i$. Hence, at the zero passage of the current wave the value Δ $i$ /Δ $t$ ($t$ denoting time) is a maximum. That is, most measuring values per unit time occur in the vicinity of the zero passage; and this phenomenon advantageously affords an accurate measuring of the phase position of the current under observation.

Measuring apparatus according to the invention, in the simplest feasible design of the electro-optical modulating equipment, need be provided with only one optical modulator such as exemplified by FIGS. 1 and 2; and in these cases it may also suffice that the discriminating network K (FIG. 1) is essentially constituted by a flip-flop stage.

With such a simple apparatus according to the invention, for example if the high-voltage current to be measured is alternating, the counting device Z 1, when the alternating current just starts from a zero passage upward on its positive half-wave, will count from zero up to a maximum and thereafter will count back to zero until the next following zero passage occurs. With such apparatus according to the invention it may happen, however, that the preparatory setting of the counting device Z 1 to alternately forward and reverse counting, will cummulatively lead to a slight counting error and ultimately to a falsification of the indicated result. Consequently, a correction will have to be made from time to time. To avoid the necessity of such correction, it is preferable to provide a modulator arrangement with a separate optical modulator unit for each of the two half-waves of the current to be measured, as this is exemplified by the above-described embodiment of FIG. 3, the two component modulators being connected through respective rectifier arrangements to the current to be measured or to an electrical magnitude derived from the current as is the case with the current-transformer output voltage U 2. In such a system the counting device Z 2 is cleared back to zero which each zero passage of the alternating current being measured, whereby systematic errors are avoided. As also exemplified by the embodiment of FIG. 3, it is preferable, to provide each of the two component optical modulators for the respective current half-waves with two light conductor rods for two pairs of photocells.

The modulators in apparatus according to the invention may be of the electro-optical or the magneto-optical type, both types being known as such. Electro-optical modulators, utilizing the Kerr effect, are known and available, for example, as Kerr cells. A series of seven such cells E$e$, E$i$, E2, ... is used in the apparatus according to FIG. 1 as illustrated at modulator M$0$ 1 in FIG. 2.

In principle, magneto-optical modulators, also known as magneto-optical Kerr effect devices, are applicable (note for example McGraw-Hill Encyclopedia of Science and Technology (1960), Vol. 7, page 337 "Kerr Effect" and Vol. 8, page 67 "Magnetooptics".

Electro-optical modulators (Kerr cells) have been extensively used for technological purposes such as the recording of sound on film and for that reason are presently more readily available with more precisely defined qualitative data than mageto-optical devices. For this reason, I prefer modulators of the electro-optical kind for the purpose of my invention at the present time. This requires that the high-voltage current to be measured must be converted to a voltage which provides the electrical field for the electro-optical modulator.

The use of magneto-optical modulators would offer the advantage that the magnetic field naturally produced by the current flowing in the high-voltage line, can be directly utilized for the purpose of optical modulation. In this case the optical medium to be subjected to the magnetic field of the current may be disposed near the high-voltage line in the same manner as is known, for example, from the galvano-magnetic devices according to U.S. Pat. No. 2,946,955. It will be understood that galvanomagnetic devices according to this patent may also be employed to furnish the current-responsive voltage U 1 or U 2, thus avoiding the use of a conventional current transformer.

The presently attainable change of the refraction index in electro-optical modulators is approximately $\Delta n = 6 \cdot 10^{-3}$ and the wave length, using a helium-neon laser, is $\lambda = 630$ nm. Assume, for example, that between the zero passage and the peak value of the current to be measured there is to be produced a difference in optical path length of $\Delta S = 1,000 \lambda$ which corresponds to 2,000 interference fringe stripes. This requires the beam of light to be radiated through a modulator length L of $L = \Delta S / \Delta n = 0.63 \cdot 10^{-3}$ m $/ 6 \cdot 10^{-3} = 0.105$ m.

Since the presently available modulator crystals have a relatively short length, it is advisable, for securing a high measuring accuracy, to compose the modulators of several individual elements as is exemplified in the above-described Kerr-cell modulator shown in FIG. 2. This permits arranging the individual elements in such a manner that the beam of light, due to the occurring reflection, passes through a relatively long path in the composite modulator thus producing correspondingly larger phase differences between the modulated and the unmodulated beam. Assume, for example, that the entire measuring range of $0.05 \cdot J_N$ to $100 J_N$ is to be covered by the apparatus and further that for the minimum current $i = 0.05 J_N$ a total of 20 measuring points between zero passage and peak value is desired. Under such circumstances the measuring of the maximum $J = 100 \cdot J_N$ would require a total of 40,000 measuring points corresponding to 20,000 $\lambda$ change in phase position.

With such extremely large path differences, for example 20,000 $\lambda$, it might happen that the radiation is no longer capable of interference. In this event the optical path length of the second component beam of light is preferably adapted to the path length of the first beam passing through the modulator. Such adaptation is effected by using a highly refractory glass specimen of suitable dimension, or by using a second modulator optical body which is not subjected to any modulating field but is interposed in the beam path of the non-modulated light beam.

In principle, even with the largest differences of 20,000 $\lambda$ corresponding to 40,000 measuring points, the photoelectric sensors and the counting devices do pose a problem because the maximal keying (clock) frequency needed for such differences is approximately 12.5 MHz and is readily applicable with commercially available electronic components.

As indicated in the foregoing, the achievement of a large measuring range as exemplified above, depends upon the provision of suitable modulator crystals, and those presently available commercially do not individually permit obtaining such a large range so that it is advantageous to have several optical modulators operate simultaneously. It is advisable that such modulators have respectively different sensitivities and a selectively operable beside each other. Depending upon the particular range comprising the current magnitude just being measured, the corresponding one modulation system is switched onto the field-producing measuring system with the other modulation systems switched off.

To those skilled in the art it will be apparent from a study of this disclosure that my invention permits of a variety of modifications and may be given embodiments other than particularly illustrated and described herein, without departing from the essential features of the invention and within the scope of the claims annexed hereto.

I claim:

1. Apparatus for measuring current in a high-voltage line and transferring the measuring result to a low-voltage locality electrically insulated from the line, comprising means at the high line voltage for providing a field varying in dependence upon the current to be measured; an optical system having a coherent light supply with two paths of respective coherent-light beams and having a field-responsive optical modulator device disposed in said field for response to the field variations, said modulator device being interposed in one of said two beam paths for modulation of one of said beams relative to the other, and said optical system having interference means subject to said modulated beam and to said unmodulated beam for producing a reversibly travelling pattern of bright-black interference fringe stripes; photoelectric sensor means responsive to said travelling interference stripes, and reversible counter means connected to said sensor means for counting said stripes, whereby the counting state of said counter means at a time corresponds to the then measured value of said current.

2. An apparatus according to claim 1, said light supply comprising coherent-light source at said low-voltage locality.

3. An apparatus according to claim 1, said light supply comprising a laser at said low-voltage locality, and a beam splitter in the beam path of said laser for splitting the source beam into said two coherent-light beams.

4. An apparatus according to claim 1, said light supply comprising a coherent-light source at said low-voltage locality and an interferometer device arranged in the beam path of said source for splitting the source beam into two coherent-light beams.

5. An apparatus according to claim 1, said field-providing means comprising a current-voltage converter responsive to the line current and having a current-proportional output voltage, and field means connected to said output voltage for producing said current-responsively varying field.

6. An apparatus according to claim 1 comprising two light conductors connected to said interference means, and said photoelectric sensor means comprising two photocells connected to said respective two light conductors to issue respective trains of electric pulses, and a discriminating control network having two inputs connected to said respective photocells to receive said pulse trains, said network having two selectively operable outputs connected to said reversible counter means for controlling it by said pulses to count in forward and reverse directions respectively.

7. An apparatus according to claim 6, said light conductors being formed of rods whose diameter corresponds to that required for complete darkening of said cells in the intervals between successive bright interference fringe stripes.

8. An apparatus according to claim 6, said network consisting substantially of a flip-flop stage.

9. An apparatus according to claim 5, said modulator device comprising two individual optical modulators for the respective two half-waves of the current to be measured, and two rectifier devices connecting said current-voltage converter to said respective modulators for controlling them in dependence upon variations of said current.

10. Apparatus according to claim 9, comprising two of said interference means connected to said respective two modulators, two pairs of light conductors, the two light conductors of each pair being connected to one of said two interference means respectively, said photoelectric sensors means comprising four photocells connected to said respective light conductors for issuing trains of electric pulses, and a control network having four inputs connected to said four photocells respectively and having outputs connected to said reversible counter device for controlling the latter.

11. An apparatus according to claim 1, said field-providing means having an electrical field, and said modulator device comprising an electro-optical modulator.

12. An apparatus according to claim 1, said field-providing means comprising a current-voltage converter disposed at said high-voltages line and having an output voltage varying in dependence upon the current to be measured, and said electro-optical modulator being connected to said converter to be controlled by said converter output voltage.

13. An apparatus according to claim 1, said modulator device being composed of a plurality of individual optical modulator members.

14. Apparatus according to claim 1, comprising a digital-analog converter connected to said counter device for furnishing a measuring value in analog form.

* * * * *